Dec. 17, 1935.　　　　C. L. PFEIFFER　　　　2,024,597
ELECTRIC WELDING MACHINE
Filed June 27, 1934　　　　3 Sheets-Sheet 1

INVENTOR
C. L. PFEIFFER
BY H. A. Whitehorn
ATTORNEY

Dec. 17, 1935.   C. L. PFEIFFER   2,024,597
ELECTRIC WELDING MACHINE
Filed June 27, 1934    3 Sheets-Sheet 2
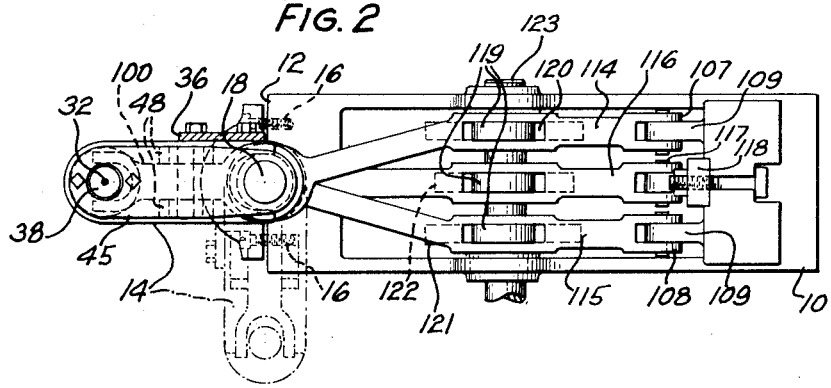
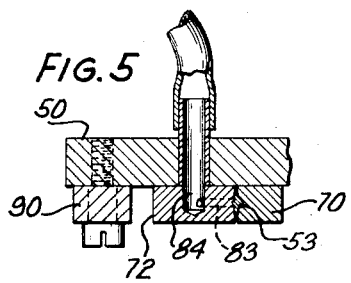
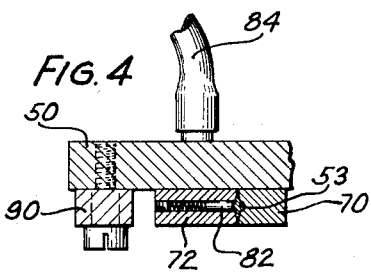
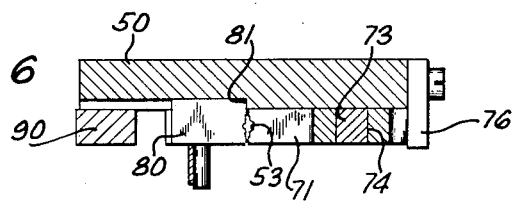
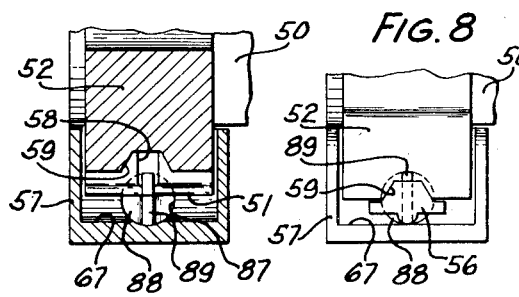
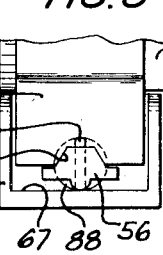
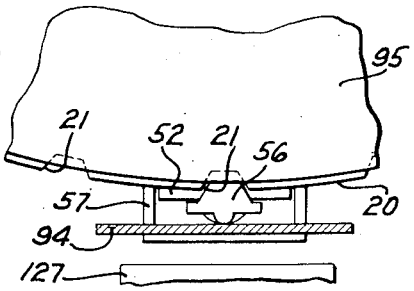
INVENTOR
C. L. PFEIFFER
BY H. A. Whitehorn
ATTORNEY Dec. 17, 1935.　　　C. L. PFEIFFER　　　2,024,597
ELECTRIC WELDING MACHINE
Filed June 27, 1934　　　3 Sheets-Sheet 3

INVENTOR
C. L. PFEIFFER
BY H. Q. Whitehorn
ATTORNEY

Patented Dec. 17, 1935

2,024,597

UNITED STATES PATENT OFFICE 2,024,597

ELECTRIC WELDING MACHINE

Conrad L. Pfeiffer, Chicago, Ill., assignor to Western Electric Company, Incorporated, New York, N. Y., a corporation of New York Application June 27, 1934, Serial No. 732,576

18 Claims. (Cl. 219—4)

This invention relates to electric welding machines, and more particularly to a machine for welding contacts to springs or other switch elements of electrical apparatus.

An object of this invention is to provide an improved welding machine of the above type, wherein contacts may be severed from a continuous length of stock, advanced to the welding position and welded in a uniform economical manner.

In accordance with one embodiment of this invention as applied to a machine for welding contacts to springs or other elements of electrical apparatus, there is provided means for intermittently advancing a continuous length of contact material along a guide channel a predetermined distance past a shear. The shear is then actuated to sever a contact from the material, whereupon a jet of compressed air directed into the channel together with gravity causes the movement of the contact to a point where it is stopped by its movement onto a yieldable member, forming a part of the channel at its discharge end, the contact coming to a halt in advance of a reciprocable feeding finger. Thereafter the finger is actuated to move the contact into a predetermined position onto a spring or other element, positioned between an upper notched electrode and a lower electrode, within the notch of the upper electrode. Means is provided for operating the welding electrodes, the contact material advancing means, the shear, and the feeding finger in timed relation to complete a cycle of operations.

Other features and advantages of this invention will more fully appear from the following detailed description taken in connection with the accompanying drawings, wherein Fig. 1 is a fragmentary side view, partly in section, of a welding machine embodying the features of this invention;

Fig. 2 is an enlarged fragmentary plan sectional view taken on the line 2—2 of Fig. 1;

Figure 3:
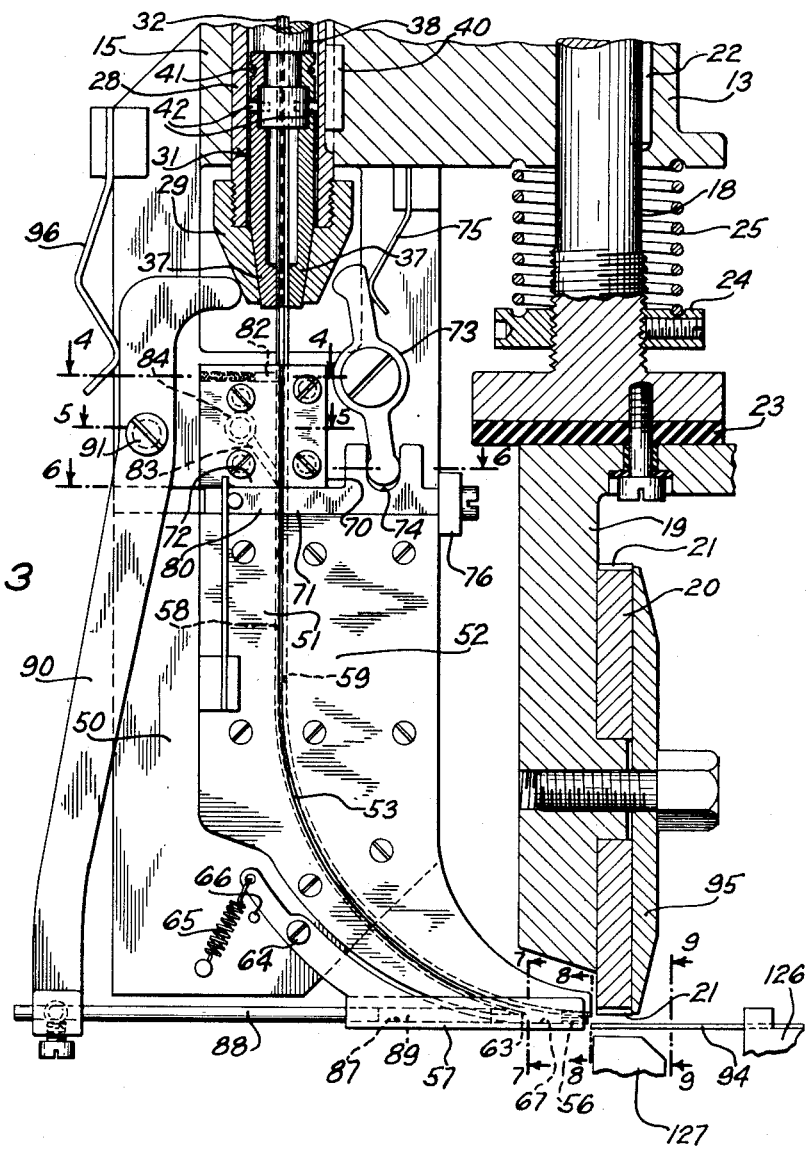
Fig. 3 is an enlarged side view, partly in section, of a portion of Fig. 1.

Figs. 4, 5 and 6 are detail plan sections taken on the lines 4—4, 5—5 and 6—6, respectively, of Fig. 3, and Figs. 7, 8 and 9 are enlarged detail vertical sections taken on the lines 7—7, 8—8 and 9—9, respectively, of Fig. 3.

Figure 1:
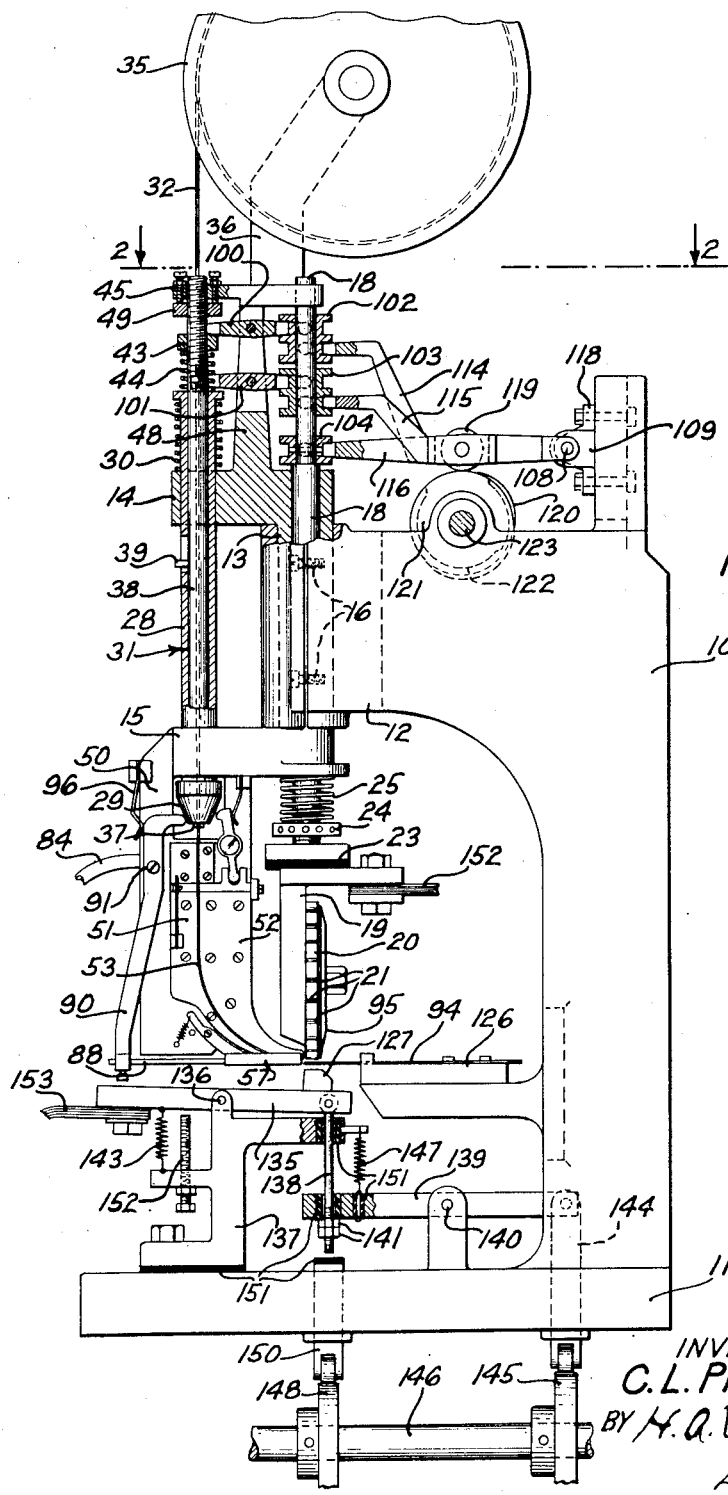

Referring now to the drawings, and particularly to Fig. 1, the numeral 10 designates a portion of a stationary vertical frame for supporting an upper welding head, the frame having a base 11. Clamped between a two-part bearing portion 12 of the frame 10 is a sleeve 13 having laterally extending spaced alined sleeve portions 14 and 15. Screws 16 serve to secure the parts of the bearing portion 12 together with the sleeve 13 held rigidly therebetween. By loosening the screws 16 the sleeve 13, which directly supports the upper welding head, is free to be rotated about the axis of the bearing portion 12 to various angular positions relative to the frame 10. The purpose of this adjustability of the sleeve 13 will be brought out hereinafter.

Extending through and longitudinally slidable in the sleeve 13 is an upper electrode supporting and actuating rod 18 carrying at its lower end an offset member 19 upon which is supported a rotatably adjustable disk electrode 20 formed with a plurality of peripheral notches 21, the surfaces of each notch forming contact surfaces. A key and slot connection indicated at 22 (Fig. 3) serves to prevent relative rotary movement between the sleeve 13 and the electrode rod 18 at all times and also serves as a connection between these members so that when the sleeve is angularly adjusted the electrode 20 will be similarly adjusted. The supporting member 19 for the electrode 20 is insulated from the actuating rod 18, as indicated at 23. When the surface of a used notch 21 becomes worn or pitted the disk electrode 20 may be rotated to aline a new notch at the welding point. Threadedly carried upon the electrode rod 18 above the portion 19 thereof is an adjustable collar 24. Surrounding the rod 18 and engaging opposed surfaces of the collar 24 and the sleeve 13 is a compression spring 25 which normally acts when released to lower the electrode rod 18 and the electrode 20 carried thereby to firmly engage a contact positioned in the notch 21 of the electrode, at this time, with work upon which the contact is resting and maintain the contact under predetermined pressure during the welding operation. By adjusting the collar 24 upwardly and downwardly upon the rod 18 the tension of the spring 25 may be varied and thereby the pressure applied during the welding operation.

Extending through and longitudinally slidable in the spaced alined sleeve portions 14 and 15 of the sleeve 13 is a plunger sleeve 28 having threadedly secured at its lower end a cone-shaped member 29, the inner diameter of the member 29 being tapered inwardly at its lower end (Figs. 1 and 3). Surrounding the upper end of the sleeve 28 and engaging opposed surfaces of the sleeve portion 14 and an annular flange of the plunger sleeve 28 is a compression spring 30 normally acting to hold the plunger sleeve in its upper position, as shown in the drawings. Longitudinally slidable in the plunger sleeve 28 and the cone member 29 is a hollow split chuck, indicated in general at 31 (Fig. 3), through which extends a continuous length of strip contact material 32 which in the operation of the apparatus is intermittently drawn, by the chuck 31, from a coiled supply 35 carried upon a bracket 36 fixed to the sleeve portion 14.

The chuck 31 comprises two jaws 37 suitably supported upon the lower end of a hollow actuating rod 38 longitudinally movable in the plunger sleeve 28, the rod 38 and the plunger sleeve 28 being prevented from relative rotary movement by means of a pin and slot connection, indicated at 39 (Fig. 1), and the sleeve 28 is prevented from rotating in the sleeve portions 14 and 15 by a key and slot connection indicated at 40 (Fig. 3). The jaws 37 at their upper ends are tied together by a wire band 41, cooperating inner and outer shoulders on the jaws and the rod 38, respectively, preventing relative longitudinal movement between the jaws and the rod. Diametrically opposite pins 42 fixed to the rod 38 and fitting loosely in apertures in the jaws 37 prevent the jaws from turning on the rod. The purpose of preventing rotation of the chuck 31 and the sleeve 28 is to prevent twisting of the strip contact material 32 which is oblong in cross-section and which has a definite surface for engagement with the spring to which it is to be welded. The peripheral surfaces of the lower ends of the jaws 37 are tapered to correspond with the taper of the inner diameter of the cone member 29. At its upper end the holler actuating rod 38 projects from the plunger sleeve 28 and carries an adjustable collar 43 (Fig. 1) and between the opposed surfaces of the sleeve 28 and the collar is a compression spring 44 normally tending to draw the hollow chuck actuating rod 38 upwardly to maintain the relative normal positions of the chuck 31 and the cone-shaped member 29, as shown in Fig. 3. The upper end of the chuck actuating rod 38, which is screw threaded, extends freely through an opening in a plate 45 fixed to the upper ends of a pair of spaced vertical arms 48 integral with the sleeve portion 14. Adjustable upon the threaded upper end of the rod 38 is a collar 49 which in cooperation with a pair of stop screws carried by the plate 45 serves as an adjustable stop for the sleeve 28 and the rod 38 in their upper normal positions (Fig. 1), under the action of the springs 30 and 44.

Secured to a depending support 50 carried by the sleeve portion 15, below the chuck 31, is a pair of cooperating slightly spaced plates 51 and 52 (Figs. 1 and 3) between which is formed a channel 53 having its upper vertical end in alinement with the contact material 32 which is fed downwardly, the material being fed into the upper end of the channel 53 for a predetermined distance below its upper end at each feeding operation of the chuck 31. At its lower end the channel 53 is curved for the purpose of guiding contacts successively sheared from the material 32, by means to be presently described, one of the contacts being indicated at 56 (Figs. 3, 8 and 9), into a horizontal position between a yieldable member 57 and the plate 52, at a point adjacent the alined notch 21 of the upper disk electrode 20. The contact material 32 in the present instance has a cross-section, which is clearly indicated in Figs. 8 and 9, in which one side of the material is provided with a continuous tapered portion, while the side opposite thereto is provided with a continuous semi-circular portion. The guide plates 51 and 52 between which is formed the guide channel 53 are correspondingly grooved, as indicated at 58 and 59, respectively, (Fig. 7) to freely receive the tapered and semi-circular opposite portions of the contact material 32 and the contacts 56, the plate 51 terminating at 63 (Fig. 3) so that the severed contacts 56 may be directed onto the yieldable member 57. The contact material may be in the form of a bi-metallic strip as described in U. S. Patent No. 1,907,931 to Henderson, or it may be composed of a single homogeneous metal or alloy.

As above stated the abutting edges of plates 51 and 52 are slightly spaced to permit small adjustments of the channel. One side of the channel is closed by the member 50 and the other side may be closed if desired. It has been found in practice, however, that the escape of air through this space at its widest adjustment is insufficient to interfere with the action of the jet of air, described later, in propelling the contacts through the channel.

Referring particularly to Fig. 3 the yieldable member 57 is pivoted at 64 to the support 50, a tension spring 65 attached to its left end normally tending to rock the member counterclockwise about its pivot against a stop pin 66 to effect a predetermined position of its right end relative to the plates 51 and 52, the right end of the member 57 being channel-shaped in cross-section (Figs. 7, 8 and 9). The tension of the spring 65 and the position of the stop pin 66 are such that the contacts 56 which freely move along the guide channel 53 are checked in their movement as they leave the channel at the point 63 and engage a horizontal supporting surface 67 of the yieldable member 57, due to the latter surface being closer to the grooved surface 59 of the plate 52 than the grooved surface 58 of the plate 51, and come to a stop adjacent the alined notch 21 of the upper disk electrode 20, as shown in Fig. 3.

Reciprocably mounted for horizontal movement between the upper end surfaces of the guide plates 51 and 52 and a block 70 carried by the support 50 is a shear blade 71 (Figs. 3 and 6), the left end thereof when moved across the guide channel 53 formed between the plates 51 and 52 cooperating with a stationary shear blade 72 carried by the support 50 to sever contacts 56 from the strip material 32 which has been fed into the channel 53, the lower end of the material during the severing operation being a predetermined distance below the upper surface of the movable shear blade 71. The block 70 and the stationary shear blade 72 form a continuation of the guide plates 51 and 52, their inner adjacent vertical faces being spaced and formed to provide a continuation of the guide channel 53 (Fig. 4). Pivoted on the support 50 above the movable shear blade 71 (Fig. 3) is a lever 73 having its lower end operatively connected to the shear blade by means of a pair of lugs on the blade, as indicated at 74, and its upper end normally predeterminedly spaced from but arranged to be engaged by the outside peripheral surface of the cone-shaped member 29 carried by the plunger sleeve 28, during the downward movement of the latter, the outside peripheral surface of the member 29 serving as a cam face. A leaf spring 75 having one end fixed to the support 50 and its free end engaging the upper end of the lever 73 normally acts to rotate the lever counterclockwise and thereby through its connection with the shear blade 71 the latter is maintained in the normal position shown in Figs. 1 and 3 with its inner end vertical face which is formed similar to the groove 59 of the guide plate 52 alined with the latter groove to permit the material 32 to be fed a predetermined distance therebelow. A stop plate 76 fixed to the support 50 against which the right end of the shear blade 71 abuts in its return movement serves to normally position the blade. It will be obvious that upon the member 29 being moved downwardly by the sleeve 28 a predetermined distance, which equals the length of the contact to be severed, and thereafter the chuck 31 and its actuating rod 38 which were moving with the sleeve 28 being halted, a continued downward movement of the sleeve 28 will cause the cam face of the member to engage the upper end of the lever 73 and rock the latter clockwise and thereby move the left end of the shear blade 71 across the channel 53 and in cooperation with the stationary blade 72 sever the material 32 and as the member 29 is retracted the spring 75 will act to return the shear blade 71 to its normal position against the stop plate 76. Between the upper surface of the guide plate 51 and the lower surface of the stationary shear blade 72 and in line with the movable shear blade 71 is a reciprocable spring pressed follower 80 (Figs. 3 and 6) which serves to return the severed contacts 56 to the guide channel 53 as the movable shear blade returns to its normal position, the severed contact dropping into the channel by gravity. A shoulder 81 on the support 50 engaged by the inner end of the follower 80 acts as a stop for the follower during its return to normal position, in which position the inner end vertical face thereof which is formed similar to the groove 58 of the guide plate 51 is alined with the latter groove.

A spring pressed plunger 82 is carried in an aperture of the stationary shear blade 72 at its upper end (Figs. 3 and 4), the inner end of the plunger constantly engaging the strip material 32 in the guide channel 53 for the purpose of applying a suitable braking pressure thereagainst so that in the return movement of plunger sleeve 28 and the chuck jaws 37 after a feeding movement the material will remain in its advanced position.

A jet of compressed air is constantly directed into the guide channel 53 at a point immediately above the upper surfaces of the shear blades 71 and 72 by means of a downwardly and angularly disposed channel 83 (Figs. 3 and 5) formed in the stationary shear blade 72, the lower end of the channel 83 communicating with the guide channel 53 just above the shearing point and the upper end thereof connecting with a supply line 84 communicating with a suitable source (not shown). The jet of compressed air directed into the guide channel 53 in conjunction with the action of gravity quickly advances the contacts 56 as they are successively severed through the guide channel and insures movement thereof to their horizontal position between the yieldable member 57 and the guide plate 52 adjacent the alined notch 21 of the upper electrode 20.

Disposed at the lower end of the guide channel 53 and reciprocable in a horizontal guideway 87 formed in the yieldable member 57 is a contact feeding finger 88 (Figs. 3 and 7). The finger 88 at its right or forward end (Fig. 3) is in the form of a vertical thin blunt edged blade, indicated at 89 (Fig. 7). At its left end the finger is circular in cross-section and pivotally connected to the lower end of a lever 90 pivoted at 91 to the support 50, the upper end of the lever being directed inwardly toward the peripheral cam face of the cone-shaped member 29 carried by the plunger sleeve 28. When the plunger sleeve 28 moves downwardly the lever 90 is rocked counterclockwise and the finger 88 is moved a predetermined distance toward the right (Fig. 3). During this movement of the finger 88 the vertical blade 89 thereof passes through a suitable slot in the guide plate 51 and into the guide channel 53, and engages the contact 56 positioned between the guide plate 52 and the surface 67 of the yieldable member 57 and moves it onto an end of a contact spring 94 positioned ready to receive it. The spring 94 is positioned directly below a notch 21 of the upper electrode 20 which at this time is in an intermediate position, having been partially lowered, previous to the feeding movement, so that the contact 56 in its movement onto the spring 94 is entered in the notch 21, the angularly disposed opposite faces of the upper portion of the contact engaging similar faces of the notch with a suitable degree of friction preliminary to the pressure exerted during the welding operation and thus the contact will be held in a horizontal position while its lower semi-circular portion rests upon the spring 94. The upper surface of the contact spring 94 and the surface 67 of the member 57 are so arranged that the surface 67 is on a slightly higher plane than the surface of the spring so that during the contact feeding movement of the finger 88 no obstruction will be encountered in the movement of the contact 56 onto the spring and within the electrode notch 21. The disk electrode 20 at its right side is equipped with a disk 95 which is so disposed relative to the notches 21 that it serves as a stop for the contacts 56 in their movement into the notch. During the movement of the cone-shaped member 29 to its upper normal position a leaf spring 96 mounted upon the support 50 and bearing against the upper end of the lever 90 rocks the latter clockwise and thereby retracts the feeding finger 88 from the guide channel 53 to clear the same for the succeeding contact when it is severed.

The chuck actuating rod 38 and the plunger sleeve 28 are moved downwardly against the action of the springs 44 and 30, respectively, to effect their several functions by levers 100 and 101 pivoted upon the spaced vertical arms 48 (Fig. 1). The levers 100 and 101 are bifurcated at each end, the furcations at the left ends thereof constantly engaging the upper surface of the collar 43 on the rod 38 and that of the annular flange at the upper end of the sleeve 28, respectively. At their right ends the furcations of the levers 100 and 101 are engaged in upper annular channels of collars 102 and 103, respectively, freely rotatable and slidable longitudinally on the upper end of the electrode supporting and actuating rod 18, the latter being slidable in an opening in the plate 45. Formed in each of the collars 102 and 103 directly below the previously mentioned annular channels thereof is a second annular channel. Fixed to the rod 18 below the collars 102 and 103 is a third collar 104 provided with a single annular channel.

Pivoted, as indicated at 107 and 108, to extending arms 109 of the frame 10 are levers 114 and 115, respectively. A third lever 116 is pivoted at 117 to a bearing block 118 which is vertically adjustable in slideways of the frame 10. At their left bifurcated ends the furcations of the levers 114, 115 and 116 are engaged in the lower channels of the collars 102 and 103 and the channel of the collar 104, respectively. Upon each of the levers 114, 115 and 116, intermediate their ends, is a roller 119, the rollers riding on rotary cams 120, 121 and 122, respectively, fixed to a shaft 123 journaled in the frame 10.

As hereinbefore described the electrode 20 at a predetermined period in the operation of the machine is partially lowered so that the contact 56 inserted in the notch 21 thereof by the feeding finger 88 will engage the contact faces of the notch with a suitable degree of friction. An accurate lowering of the electrode 20 which is controlled by the cam 121 acting upon the lever 116 the required distance is controlled by vertically adjusting the pivot bearing block 118 for the lever 116 on the slideways of the frame 10 which will raise or lower the pivot 117 of the lever and thereby vary the initial position of the electrode 20 and thus determine the distance the electrode will move down under the action of the spring 25 when the cam 121 in its rotation permits the spring to act. The necessity of this adjustment is due to wear on the surfaces of the notch 21 or slight variations in the dimensions of the strip contact material 32 from which the contacts 56 are severed.

In the rotation of the shaft 123 the cams 120, 121 and 122, which have a suitable peripheral contour, engage the rollers 119 carried by the levers 114, 115 and 116, respectively, and in cooperation with the springs 25, 30 and 44, which normally act to lower the rod 18 carrying the upper electrode 20 and raise the plunger sleeve 28 and chuck actuating rod 38, respectively, operate the mentioned levers in timed relation to control the various operations of the upper welding head. The levers 114 and 115 upon being rocked clockwise, through their connection with the levers 100 and 101, respectively, at the collars 102 and 103, respectively, cause the levers 100 and 101 to be rocked counterclockwise and thus depress the plunger sleeve 28 and the chuck actuating rod 38 against the action of the springs 30 and 44, respectively, during certain periods in the rotation of the cams 120 and 122 and permit the springs to act during other periods in the rotation thereof. The lever 116 which acts directly upon the upper electrode carrying rod 18 will raise the latter against the action of the spring 25 during one period in the rotation of the cam 121 and permit the spring to act during other periods in the rotation thereof.

Referring particularly to Fig. 1, the upper welding head, which is rotatably adjustable about the axis of the sleeve 13, is shown clamped to the sleeve by the screws 16, in such an angular position relative to the frame 10 that the rectangular-shaped contacts 56 will be delivered upon and welded to the spring 94 or other switch element with their length extending parallel to the length of the spring.

In certain types of electrical apparatus it is desirable that the contacts 56 be welded to the springs 94 at varying angles to the length of the springs, for instance, at right angles thereto. In the latter case the screws 16 are merely loosened and the upper welding head as a whole is rotated about the axis of the sleeve 13 until it is positioned 90° from the position shown by full lines in Fig. 2 to the position shown by broken lines in the same figure and the screws 16 are again tightened. This angular adjustment of the upper welding head is readily permitted, without any other operation or disconnecting of parts, or in any way disturbing the setting of the machine, due to the use of the annularly channeled collars 102, 103 and 104 surrounding the electrode carrying and actuating rod 18, in the channels of which the various levers are freely engaged.

The spring or other element 94 to which a contact 56 is to be welded is supported in a predetermined position during the welding operation upon a stationary fixture 126 removably fixed to the frame 10. As clearly shown in Fig. 3 the left end of the spring 94 extends from the fixture 126 into a gap between the upper electrode 20 and a lower electrode 127, the electrodes at the time of positioning the spring upon the fixture being appreciably spaced apart for the purpose of facilitating the positioning of the spring. Although in the illustrated embodiment of the invention the springs 94 are manually positioned on the fixture 126, suitable automatic means may be associated with the machine for automatically and intermittently feeding a train of springs forward to the welding position in timed relation to the operation of the welding machine.

The lower electrode 127 is fixed to a current conducting plate 135 (Fig. 1) pivoted at 136 upon a vertical standard 137 fixed to the base 11. At its right end the plate 135 is pivoted to one end of a link 138 which at its lower end freely extends through an aperture in a lever 139 pivoted at 140, the lower end of the link having threaded thereon adjusting and locking nuts 141, the adjusting nut abutting the lower surface of the lever under the action of a tension spring 143 operatively connected to the left end of the plate 135. The right end of the lever 139 is pivoted to the upper end of a bar 144 vertically slidable in an opening in the base 11, the lower end of the bar carrying a roller which rides upon the periphery of a rotatable cam 145 fixed to a shaft 146 which may be journaled on the base 11, in a manner not shown. Operatively connected to the left end of the lever 139 is a tension spring 147 which serves to maintain the roller carried by the bar 144 constantly in engagement with the cam 145. Also fixed to the shaft 146 is a rotatable cam 148, upon the periphery of which rides a roller carried upon the lower end of a bar 150 vertically slidable in an opening in the base 11, the upper end of the bar 150 being alined with the lower end of the link 138 and normally spaced therefrom as shown in Fig. 1. The lower electrode 127 is insulated from the base 11 and the frame 10 as indicated at the points 151.

Arranged below the left end of the pivotal plate 135 is an adjustable stop screw 152 which limits the movement of the plate in a counterclockwise direction and thereby the upward limit of travel of the lower electrode 127 during the operation of the machine. The lower normal position of the lower electrode 127, as shown in Fig. 1, is determined by the position of the adjusting nut 141 on the link 138.

The peripheral contour of the cams 145 and 148 associated with the operation of the lower electrode 127 are such and so timed in their action relative to each other and to the cams 120, 121 and 122 that at a predetermined period, in the operation of the machine, the lever 139 will be rocked clockwise by the action of the spring 147 as the peripheral surface of the cam 145 recedes from the roller on the bar 144, which is attached to the lever. Thus the left end of the lever 139 will move upwardly and the plate 135 carrying the electrode 147 will follow, due to the action of the spring 143, the upward movement of the electrode being limited by the stop screw 152 with which the left end of the plate 135 engages. Shortly after this movement of the lower electrode 127 and during the continued rotation of the shaft 146 the cam 148 moves the roller and the bar 150 upwardly a predetermined distance to close the gap between the lower end of the link 138 and the upper end of the bar and thus providing a rigid support or stop for the lower electrode 127 during the welding period which takes place after the upper electrode 20 is lowered under full tension of the spring 25.

Although not illustrated in the drawings it is to be understood that the shafts 123 and 146 are rotated in synchronism at predetermined rates of speed, from a driving mechanism which includes a source of power, for instance, an electric motor and an associated speed reducing mechanism, the driving mechanism also including a clutch mechanism which may be set at will for either continuous repeat operation of the machine, or for a single cycle of operation, at the end of which the clutch is opened and the machine stops with the elements thereof positioned ready for the next cycle of operation. Also, a usual transformer and timing switch connected to a primary source of current, for controlling the timing of the current supply to the primary winding of the transformer in order that the current to the electrodes 20 and 127, connected from the secondary terminals of the transformer by flat strip flexible leads 152 and 153, respectively, may be cut on or off at the correct intervals during operation, have been omitted. The details of the driving mechanism for the shafts 123 and 146 and the means for supplying and periodically controlling the welding current to the electrodes 20 and 127 have been omitted from the disclosure for the sake of simplifying the same, since their construction is obvious and a detailed description thereof is not necessary to a complete understanding of the invention. Reference is made to Hosford Patents 1,090,618 and 1,090,619 which disclose timing switches suitable for use with the machine described herein.

The operation of the machine is briefly as follows: At the completion of each cycle of operation the operating parts of the machine are in the positions shown in the drawings and a contact 56 is positioned, as shown in broken lines, at the lower end of the guide channel 53 (Fig. 3) adjacent the alined notch 21 of the upper electrode 20 and in advance of the feeding finger 88, the contact having in the previous operating cycle of the machine been severed from the material 32 and delivered to the position shown. With the parts of the machine positioned as shown in the drawings a contact spring 94 upon which a contact 56 is to be welded is positioned upon the fixture 126. The shafts 123 and 146 are set in motion to complete a cycle of operation at the beginning of which the lower electrode 127 is caused to move upwardly, by the rotation of the cam 145, a predetermined distance to cause the upper surface thereof to engage the lower surface of the spring 94. The rotation of the cam 122 on the shaft 123 permits the lever 116 to rock counterclockwise and thereby the upper electrode 20 to be lowered to a definite intermediate position by the action of the spring 25, the electrode still being held by the cam against the tension of the spring 25. In the described positions of the upper and lower electrodes the contact 56 may be fed with a sliding engagement into the notch 21 of the upper electrode and onto the upper surface of the contact spring 94.

In the continued rotation of the shaft 123 the cams 120 and 121, with which the levers 114 and 115 are engaged, respectievly, are rotated and through the connected levers 114 and 100 associated with the chuck actuating rod 38 and the connected levers 115 and 101 associated with the plunger sleeve 28 the rod and the sleeve together with the chuck 31 are moved downwardly in unison against the action of the springs 44 and 30 a predetermined distance. This movement of the chuck 31 feeds the strip material 32 from the supply 35 thereof the length of the contact 56, to be severed therefrom, below the upper surface of the movable shear blade 71 and simultaneously therewith the cam face of the cone-shaped member 29 carried by the plunger sleeve 28 riding against the upper end of the lever 90 rocks the same counterclockwise and causes the feeding finger 88 carried at its lower end to travel toward the right. After the material 32 has been fed downward the required distance the cam 120 causes the rod 38 and the attached chuck 31 to be held from further movement, but the plunger sleeve 28, through the action of the cam 121, continues its downward movement. Thus the movement of the feeding finger 88 continues and moves the contact 56 previously severed and positioned upon the yieldable member 57 adjacent the alined notch 21 of the upper electrode 20, which electrode had previously been lowered to an intermediate position, into the notch of the electrode and onto the upper surface of the contact spring 94 supported by the lower electrode 127.

In timed relation with the positioning of the contact 56, within the electrode notch 21 and upon the contact spring 94, the cam face of the cone-shaped member 29 in the continued downward movement thereof engages the upper end of the lever 73 and rocks it clockwise, thus moving the shear blade 71 to the right and severing the length of strip material 32 previously fed below the shearing point. The severed contact is carried to the left of the channel 53 between the adjacent ends of the shear blade 71 and the spring pressed follower 80.

With the contact 56 fed into the notch 21 of the upper electrode 20 and upon the contact spring 94, which is engaging the lower electrode 127, the cam 122 in its continued rotation permits, through a further lowering of the left end of the associated lever 116, the spring 25 to act under full tension upon the upper electrode 20, which is thus further lowered and engaged under a predetermined pressure with the contact 56. Simultaneously with the feeding of the contact 56 between the upper electrode 20 and the contact spring 94 the cam 148 on the shaft 146 acts to raise the stop bar 150 into engagement with the lower end of the link 138 and thus providing a rigid support for the lower electrode 127 during the welding period. Immediately thereafter the circuit of the primary of the transformer (not shown) is momentarily closed by the timing switch (not shown) and the circuit of the secondary, which includes the leads 152 and 153, being closed through the contact spring 94 and the contact 56, the contact is welded to the contact spring. In the continued rotation of the cam 122 to complete a cycle of rotation thereof it raises the upper electrode 20 to its normal position against the action of the spring 25 and holds it. Also the cams 145 and 148 in completing their cycle of rotation permit the lower electrode 127 to return to its lowered normal position.

After the completion of the severing operation the continued rotation of the cams 120 and 121 permit the rod 38 carrying the chuck 31 to first move upwardly, under the action of the spring 44, followed by the upward movement of the plunger sleeve 28 carrying the cone-shaped member 29, under the action of the spring 30, at the end of which movements the chuck has again gripped the strip material ready for the next feeding movement thereof. As the member 29 rises the lever 90 carrying the contact feeding finger 88 and the shear blade 71 return to their normal positions. The movement of the shear blade permits the follower 80 to carry the sheared contact into alinement with the guide channel 53 into which it drops and is quickly advanced therethrough, aided by the jet of compressed air constantly directed through the channel 83 into the guide channel 53 at a point immediately above the shearing point, to its horizontal position between the yieldable member 57 and the guide plate 52 adjacent the alined notch 21 of the upper electrode 20. It is to be understood that the movement of the contact feeding finger 88 to its normal position is so timed relative to the movement of the shear blade 71 and the follower 80 to their normal positions that the finger is clear of the guide channel 53 before the contact 56 reaches its horizontal position at the lower end of the guide channel. This constitutes a complete cycle of operation of the machine.

Although the invention has been disclosed and described as applied to a machine for welding particularly shaped parts, it is clear that it may have a more general application and that modifications can be made without departing from the spirit and scope of the appended claims.

What is claimed is:

1. In an electric welding machine, a welding electrode, and means for feeding material to be welded, comprising a curved channel ending adjacent said electrode, a yieldable member forming one side of the channel at said end for receiving the fed material, and a reciprocatory element operable through a wall of said channel for pushing material from said member to a face of said electrode.

2. In an electric welding machine, a welding electrode, and means for feeding material to be welded, comprising a guide channel ending adjacent said electrode, means for feeding strip material to said channel, means for cutting sections from said strip material, and a reciprocatory element at the end of said channel for feeding said sections to a face of said electrode.

3. In an electric welding machine, a welding electrode and means for feeding material to be welded, comprising means for advancing strip material at an angle to the welding face of said electrode, a curved guide for changing the direction of said material so that it will be parallel to said welding face, means for cutting sections from said material, and means for advancing said sections to said electrode.

4. In a welding machine, a welding electrode, means for holding a piece of metal to be welded adjacent the electrode, means for feeding an elongated piece of metal into engagement with said first piece, said feeding means and electrode being mounted for pivotal unisonal movement about a fixed axis to vary the angle at which the elongated piece will lie with respect to the first piece.

5. In a welding machine, welding electrodes and means for feeding parts to be welded, said feeding means and one of said electrodes being mounted for pivotal movement about an axis passing through said electrodes.

6. In an electric welding machine, a pair of relatively movable opposed electrodes, means for supporting a member in welding position between said electrodes, means for yieldably supporting an element to be welded to the member in a predetermined position adjacent the welding position for subsequent positioning on the member, means for guiding an element advanced from a plane removed from said supporting means into supporting relation therewith, and means for moving the element from said supporting means and into a predetermined position on the member and between said electrodes.

7. In an electric welding machine, a pair of movable opposed electrodes, means for supporting a member in welding position between said electrodes and spaced from one of them, relatively yieldable members for supporting an element to be welded to the member in a predetermined position adjacent the welding position for subsequent positioning on the member, means for guiding an element advanced from a plane removed from said relatively movable members into supporting relation therewith, and means for moving the element from between said members and into a predetermined position on the member and between said electrodes.

8. In an electric welding machine, a pair of relatively movable opposed electrodes, means for supporting a member in welding position between said electrodes, means for yieldably supporting an element to be welded to the member in a predetermined position adjacent the welding position for subsequent positioning on the member, means forming a channel for guiding an element advanced from a plane removed from said means into supporting relation therewith, means for directing a blast of compressed medium into the guide channel and against the element to insure the movement thereof into association with said supporting means, means for moving the element from said supporting means and into a predetermined position in contact with the member and between said electrodes.

9. In an electric welding machine, a pair of relatively movable opposed electrodes, one of said electrodes being circular and formed with a plurality of peripheral notches, the surfaces of the notches forming contact surfaces for engaging an element entered in an alined notch in the welding position for welding to a member, means for supporting the member in welding position between said electrodes, and means for rotatably adjustably supporting said circular electrode to present new notches at the welding position as they become worn, said circular electrode being normally non-rotatable.

10. In an electric welding machine, a frame, a pair of opposed electrodes relatively movable toward each other on said frame, one of said electrodes having a notch, the surfaces of the notch forming contact surfaces for engaging an element entered in the notch for welding to a member, means fixed relative to said frame for supporting the member in welding position between said electrodes, means for supporting said notched electrode on said frame for rotation about a fixed axis whereby the element carried in the notch thereof may be welded at various angles to the member mounted in a fixed position, and means for closing said electrodes upon the element and the member, said means including means constantly operatively connected to said rotatably adjustable electrode in any adjusted position thereof.

11. In a welding machine, a pair of electrodes, means for feeding parts to be welded, one of said electrodes being mounted for motion toward and from the work, a lever having a pivotal operative connection at one end with said electrode for moving said electrode and at its opposite end being pivoted about a normally fixed axis, and a rotary cam for moving said lever, said latter pivot of said lever being adjustable for varying the travel of said electrode.

12. In a welding machine, an electrode mounted for reciprocatory motion in an axis and for rotary motion about said axis, and a work feeding means pivotally mounted on said axis.

13. In an electric welding machine, a pair of opposed electrodes movable towards each other, means for supporting a member in welding position between and spaced from said electrodes while in their normal position, means for feeding an element into a predetermined welding position on the member, a support for one of said electrodes movable to rigidly support the same after a movement thereof into welding relation with the member, and means for operating said electrodes, said feeding means and said support in timed relation to first move one electrode into welding relation with the member, thereafter feeding and positioning the element on the member, then moving said support into operative relation with said electrode, and finally moving the other of said electrodes into welding relation with the element on the member.

14. In an electric welding machine, a pair of opposed electrodes movable towards each other, one of said electrodes having a notch, the surfaces of the notch forming contact surfaces for engaging a contact entered in the notch for feeding to an electrical contact spring, means for supporting a spring in welding position between and spaced from said electrodes while in their normal position, means for feeding a contact into a predetermined position in the notch while the notched electrode is in a definite intermediate position for receiving it and onto the spring, a support for the other of said electrodes movable to rigidly support the same after a movement thereof into welding relation with the spring, and means for operating said electrodes, said feeding means and said support in timed relation to first move one electrode into welding relation with the spring, thereafter moving the notched electrode to its intermediate position, feeding and positioning the contact in the electrode notch and upon the spring, then moving said support into operative relation with said electrode, and finally moving the notched electrode into welding relation with the contact on the spring.

15. In an electric welding machine, a pair of relatively movable opposed electrodes, means for supporting an electrical contact spring in welding position between and spaced from one of said electrodes, means for intermittently advancing a continuous length of contact material along a definite path, means adjacent the path of movement of the material for shearing a contact from the material after a predetermined length thereof has been advanced therepast, means for guiding a sheared contact moving under the action of gravity onto the spring, and means for operating said material feeding means, said shearing means and said electrodes in timed relation to first feed the material, shear a contact therefrom and then engage said electrodes in welding relation with the contact and the spring.

16. In a welding machine, a pair of electrodes movable toward and from each other, means for feeding work between said electrodes, means for moving said electrodes apart to permit the insertion of work, means for moving one of said electrodes toward the work comprising a firm abutment therefor during the welding operation, and resilient means for pressing the other electrode against the work.

17. In an electric welding machine, a welding electrode and means for feeding material to be welded, comprising a guide passage having a yieldable portion ending adjacent said electrode for supporting the fed material thereat, and means for directing a gaseous medium under pressure through the passage to propel the material onto the yieldable portion of said guide passage.

18. In an electric welding machine a welding electrode, and means for feeding material to be welded, comprising spaced guide members forming a channel ending adjacent said electrode, means for feeding strip material to said channel, means for cutting sections from said strip material, one of said guide members having a yieldable portion at said end forming in cooperation with the other guide member a restricted channel for receiving the sections and predeterminedly positioning them adjacent said electrode, and means for advancing said sections from the restricted channel to said electrode.

CONRAD L. PFEIFFER.